United States Patent [19]

McCloskey et al.

[11] Patent Number: 5,521,275
[45] Date of Patent: May 28, 1996

[54] METHOD FOR IMPROVING CATALYST EFFICIENCY DURING POLYCARBONATE REDISTRIBUTION

[75] Inventors: Patrick J. McCloskey, Watervliet; David M. Dardaris, Ballston Spa, both of N.Y.; Eric T. Gohr; Pin-pin Wu, both of Evansville, Ind.

[73] Assignee: General Electric Company, Schenectady, N.Y.

[21] Appl. No.: 523,666

[22] Filed: Sep. 5, 1995

[51] Int. Cl.$^6$ .................................................. C08G 64/00
[52] U.S. Cl. ................ 528/196; 264/176.1; 264/177.19; 264/182; 264/209.6; 264/211.24; 525/191; 525/198; 525/462; 525/469; 528/198; 528/502 R
[58] Field of Search ........................... 264/176.1, 177.19, 264/182, 209.8, 211.24; 528/196, 198, 502; 525/462, 469, 191, 198

[56] References Cited

U.S. PATENT DOCUMENTS 5,414,057  5/1995  Campbell et al. ...................... 525/462

*Primary Examiner*—James J. Seidleck
*Assistant Examiner*—Terressa M. Mosley
*Attorney, Agent, or Firm*—William H. Pittman

[57] ABSTRACT

The efficiency of a redistribution catalyst during polycarbonate redistribution is improved by employing an extruder screw design that provides a melt seal between the extruder throat and the vacuum port. A melt seal exists when the free volume within the extruder is sufficiently filled with molten resin so as to prevent the passage of gases between sections of the extruder.

19 Claims, No Drawings

METHOD FOR IMPROVING CATALYST EFFICIENCY DURING POLYCARBONATE REDISTRIBUTION

BACKGROUND OF THE INVENTION

Redistribution is a process whereby a resin of lower molecular weight is prepared from a resin of higher molecular weight by a reactive extrusion process. This invention relates to a method of enhancing the catalyst efficiency during polycarbonate redistribution. More particularly, it relates to a method of improving the catalyst efficiency during redistribution by employing an extruder screw design that provides a melt seal between the extruder throat and the vacuum port. A melt seal exists when the free volume within the extruder is sufficiently filled with molten resin so as to prevent the passage of gases between sections of the extruder.

Polycarbonates are well known high performance engineering thermoplastics characterized by many advantageous physical properties, such as high optical clarity, toughness, dimensional stability and excellent impact strength over a wide temperature range.

Typically, in a manufacturing environment, different grades of polycarbonate, characterized primarily by different weight average molecular weights, are prepared in separate lots. To transition from one lot, or molecular weight grade, to another results in the production of a significant amount of material with variable molecular weight until the production line is completely purged of the prior grade. Transition grade materials must be inventoried and later matched and blended with other grades of polymer to obtain a grade with commercially acceptable properties. Often there are inconsistencies between the properties of transition grade batches, causing variation in matching and blending from batch to batch.

Recycling processes have become of increasing importance in the last few years; they are viewed as one way to minimize the volume of waste material that must be disposed of in landfills or the like. Therefore, it is desirable to provide processes for recycling scrap polymers, including polycarbonates.

In view of the above, it would be desirable to provide a practical method of reforming polycarbonates, including used polycarbonates and newly produced polycarbonate that have an initial weight average molecular weight, into a variety of commercial grade polycarbonate compositions characterized primarily by different molecular weights. Such a process would eliminate transition grade polycarbonate and the aforementioned problems associated with it, and would also permit recycle of scrap and post-consumer polycarbonate.

A method of redistributing polycarbonate has been disclosed in commonly owned U.S. Pat. No. 5,414,057. That method comprises the step of melt equilibrating an initial polycarbonate composition in a mixture that includes a catalytic amount of a polycarbonate redistribution catalyst under reaction conditions such that a redistributed polycarbonate composition is formed.

In a typical redistribution process, the catalyst comprises a tetraalkyl ammonium base. During the course of the process, the tetraalkyl ammonium base can decompose to form a trialkyl amine. If it is not removed, this trialkyl amine will be present in the final redistributed product, resulting in a degradation of the polycarbonate's material properties.

The trialkyl amine can be removed by extruder devolatilization via one or more vacuum ports in the extruder.

It is desirable to enhance the catalyst efficiency in a redistribution process so that the quantity of catalyst is minimized while the weight reduction of the polycarbonate is maximized. At the same time, it is desirable to prevent the pulling of air into the extruder as a result of the vacuum port(s), as the introduction of air into the extruder will quench the redistribution reaction.

SUMMARY OF THE INVENTION

The present invention provides a method of redistributing polycarbonate comprising the step of melt equilibrating a mixture comprising:

a. a polycarbonate having a weight average molecular weight of 500 to 200,000, and, b. a polycarbonate redistribution catalyst, at a temperature of 180° C. to 320° C. in an extruder comprising at least one screw, a feed throat and at least one vacuum port, wherein said extruder produces a melt seal, said melt seal located between the feed throat and the vacuum port that is closest to the feed throat.

DETAILED DESCRIPTION OF THE PREFERRED EMBODIMENT

The present invention relates to a method for improving the efficiency of a polycarbonate redistribution catalyst in a redistribution reaction by utilizing a screw design that ensures the formation of a melt seal within the extruder. The method comprises the step of melt equilibrating a polycarbonate composition and a redistribution catalyst with an extruder that produces a melt seal.

The manufacture of polycarbonate is well known in the art. There is no limit on the polycarbonate that can be employed in the instant invention.

Appropriate polycarbonates for use in the instant invention include those materials that comprise structural units of the formula

wherein $R^1$ is a divalent organic radical. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and linking radicals such as thio, sulfoxy, sulfone, ester, amide, ether and carbonyl. Most often, however, all $R^1$ radicals are hydrocarbon radicals.

Preferably $R^1$ is aromatic. More preferably, the aromatic $R^1$ radicals have the formula

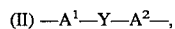

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals that contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

Polycarbonate is produced by several methods, including an interfacial polymerization method and a melt transesterification method. Polycarbonates made by any method can be utilized in the present invention.

Polycarbonates can be prepared by a heterogeneous interfacial polymerization method. Usually an organic bishydroxy compound, such as 2,2-bis(4-hydroxyphenyl)propane ("bisphenol A"), is reacted with a carbonate precursor, such as phosgene, in the presence of an interfacial polycarbonate condensation catalyst. This process is conducted in a mixed aqueous-organic system which results in recovery of the polycarbonate in the organic phase. A chain terminating agent, such as a mono-functional phenol, is employed to control molecular weight. Accordingly, different grades of polycarbonates characterized primarily by different weight average molecular weights can be prepared by varying the amount of chain terminating agent.

Polycarbonate can also be manufactured by melt transesterification such as the processes disclosed in commonly owned U.S. Pat. Nos. 5,319,066 and 5,412,061, which are incorporated herein by reference. Typically, such a process comprises the step of reacting a diaryl carbonate and an aromatic bis hydroxy compound under melt polymerization conditions in the presence of a suitable condensation catalyst.

In accordance with the process of this invention, any of the above-identified polycarbonates having an initial weight average molecular weight typically in the range from about 500 to 200,000 may be reformed into a final polycarbonate composition having a different molecular weight. Preferably, the weight average molecular weight range is from about 5000 to about 100,000. All molecular weights are as determined by gel permeation chromatography, using polystyrene as a reference material. The polycarbonate can comprise mixtures of different linear or branched polycarbonates and mixtures of linear and branched polycarbonates. The process is particularly useful with recycled polycarbonates, whether linear or branched, including polymers formulated into such products as optical disks (usually linear) and blow-molded bottles (usually branched).

The redistribution process involves melt equilibrating the polycarbonate in the presence of a polycarbonate redistribution catalyst. Melt equilibration involves heating the polymer at a temperature sufficient to produce a melt for a time sufficient to achieve redistribution equilibrium. Typically, when the starting material is a single homopolymer or copolymer, redistribution converts the starting polycarbonate into a redistributed polycarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

A second polymer other than polycarbonate can be blended with the polycarbonate powder before the redistribution reaction is begun. There is no limitation on the type of polymer that can be blended with the polycarbonate. Such second polymers include acrylonitrile/butadiene/styrene (ABS) copolymers, polyesters such as polybutyl terephthalate (PBT), polyphenylene oxides, polyamides and polyimides. Preferably, the polycarbonate is blended with a acrylonitrile/butadiene/styrene copolymer or polybutyl terephthalate.

Suitable carbonate redistribution catalysts include a wide variety of bases and Lewis acids. Illustrative examples include amines, particularly 1,3-dimethylaminopropane, imidazole, benzimidazole, and benzotriazole. Other organic bases can also be used, for example, tetraalkyl ammonium hydroxides, such as tetramethyl ammonium hydroxide, usually as the pentahydrate, and tetraethyl ammonium hydroxide; tetraalkyl ammonium phenoxides, such as tetramethyl ammonium phenoxide, usually as the monohydrate; tetraalkyl ammonium acetates, such as tetramethyl ammonium acetate; tetraalkyl ammonium tetraphenylborates, such as tetramethyl ammonium tetraphenylborate; lithium stearate; the lithium salt of bisphenol A; the tetraethyl ammonium salt of bisphenol A; and sodium phenoxide. Suitable organic bases also include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis[(dibutyl)(phenoxy)tin] oxide, and tributyltin hydride; organotitanium compounds, such as titanium tetra(isopropoxide), titanium tetra(5-methylheptoxide), and titanium tetra(butoxide); zirconium tetra(isopropoxide); aluminum tri(ethoxide); aluminum tri(phenoxide); mercuric acetate; lead acetate; (diphenyl)mercury; (tetraphenyl)lead; and (tetraphenyl)silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethyl ammonium borohydride, tetra(n-butyl ammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide. Preferably, the catalyst is a tetraalkyl ammonium base, such as a tetraalkyl ammonium hydroxide, acetate, or phenoxide. More preferably, the catalyst is a tetraalkyl ammonium hydroxide, wherein each alkyl moiety contains from 1 to about 16 carbon atoms, more preferably, from 1 to about 10 carbon atoms, and most preferably, from 1 to about 4 carbon atoms.

The amount of carbonate redistribution catalyst employed in the process of this invention may be any amount which is effective in promoting the redistribution process. Usually the effective amount will depend upon the particular catalyst employed, the reaction rate desired, the particular molecular weight desired in the redistributed composition, and to a lesser extent on the chemical nature of the particular starting polycarbonate composition. Depending upon such variables, an effective amount of catalyst can easily be determined without undue experimentation. It is preferred that when the catalyst is a tetraalkyl ammonium hydroxide, the amount of catalyst ranges from about 15 ppm to about 1000 ppm based upon the amount of starting polycarbonate. More preferably, the amount of such catalyst ranges from about 30 ppm to about 180 ppm.

Optionally, a diaryl carbonate may be added to the polycarbonate to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate employed in the process of this invention may be any amount which provides the desired molecular weight in the redistributed polycarbonate composition. Usually, the amount of diaryl carbonate is no greater than about 1.5 weight percent based upon the amount of starting polycarbonate; more preferably, the amount is no greater than about 1.0 weight percent.

The redistribution process of this invention can be effected by dry mixing the starting polycarbonate, the carbonate redistribution catalyst, and optionally, the diaryl carbonate, and melt equilibrating the resulting mixture at a temperature ranging from about 180° C. to about 320° C. Preferably, the temperature ranges from about 250° C. to about 300° C.

Extruder design and extruder screw design are important to the present invention. Standard extruder designs that are well known in the art can be utilized in the present invention. In addition to a feed throat, the extruder must have at least one vacuum port through which gases, including the trialkyl amine, formed during decomposition of the carbonate redistribution catalyst can be vented. The extruder can be either a single screw or twin screw extruder. One skilled in the art will recognize that the screw speed and feed rate may vary.

The extruder screw configuration is of greater importance. Various screw designs are well known by those skilled in the art. For use in the present invention, the screw must be configured in such a way that a melt seal develops inside the extruder. A melt seal exists when the free volume within the extruder is sufficiently filled with molten resin so as to prevent the passage of gases between the section of the extruder in close proximity to the feed throat and the section of the extruder in close proximity to the vacuum port nearest to the feed throat. This melt seal must be located between the feed throat of the extruder and the vacuum port that is closest to the feed throat. The melt seal operates to prevent the pulling of air through the extruder by the force of the vacuum. Any screw design, whether single or double screw, that results in the proper placement of the melt seal within the extruder can be used to practice the method of the present invention. An appropriate screw design is easily determinable by those skilled in the art.

EXAMPLE

Polycarbonate was extruded through a Werner & Pfleiderer twin screw extruder. Two batches of polycarbonate were extruded for the examples: Batch ML-5221 was a low molecular weight grade (38,700 weight average molecular weight), while ML-4505 was a high molecular weight grade (51,000 weight average molecular weight). For each extrusion, the extruder temperature was set at 180° C. at the feed section of the extruder and 260° C. for the length of the extruder. The redistribution catalyst was tetraethyl ammonium acetate (monohydrate) (TEAA). 335 ppm, by weight based on the polycarbonate, of TEAA was blended with the polycarbonate powder in a one gallon Henschel mixer for one minute. One kg of polycarbonate powder mix was extruded in each example at a feed rate of 12.0 lbs/hr and a screw speed of 325 rpm. When it was used, a vacuum of 0.08 MPa was applied via either a single or double vent.

The results of each example are presented in Table 1.

TABLE 1

Extruded on 28 mm W&P TSE

| EX. # | FORMULATION | CONDITIONS | MOLECULAR WEIGHT |
|---|---|---|---|
| 1. | ML-5221 | | 38,700 |
| 2. | ML-5221 + 335 ppm TEAA | Single vent, melt seal full vacuum | 32,600 |
| 3. | ML-5221 + 335 ppm TEAA | Double vent, no melt seal fun vacuum | 36,000 |
| 4 | ML-5221 + 335 ppm TEAA | Double vent, no melt seal no applied vacuum | 34,700 |
| 5 | ML-5221 + 335 ppm TEAA | Double vent, melt seal fun vacuum | 32,600 |
| 6 | ML-4505 | | 51,000 |
| 7 | ML-4505 + 335 ppm TEAA | Single vent, melt seal full vacuum | 42,000 |
| 8 | ML4505 + 335 ppm TEAA | Double vent, no melt seal full vacuum | 50,000 |
| 9 | ML-4505 + 335 ppm TEAA | Double vent, no melt seal no applied vacuum | 44,400 |
| 10 | ML-4505 + 335 ppm TEAA | Double vent, melt seal full vacuum | 40,800 |

For a given quantity of catalyst (TEAA), the molecular weight was reduced more when air was not allowed to be pulled through the extruder, thereby quenching the redistribution reaction. The most efficient use of the catalyst and the greatest reduction in molecular weight occured when a melt seal was created. While the molecular weight was reduced when vacuum was not applied, the reaction was not as efficient and the quality of the resulting product would suffer as undesirable catalyst byproducts were not removed by devolatilization. The creation of a melt seal provided a greater reduction of weight average molecular weight in the polycarbonate without increasing the quantity of catalyst required. This provides a less expensive process. The resulting redistributed product is of higher purity because there is less catalyst residue left in the polycarbonate.

What is claimed is:

1. A method of redistributing polycarbonate comprising the step of melt equilibrating a mixture comprising:
   a. a polycarbonate having a weight average molecular weight of 500 to 200,000, and,
   b. a polycarbonate redistribution catalyst,
   at a temperature of 180° C. to 320° C. in an extruder comprising at least one screw, a feed throat and at least one vacuum port, wherein said extruder produces a melt seal, said melt seal located between the feed throat and the vacuum port that is closest to the feed throat.

2. A method in accordance with claim 1, wherein said polycarbonate comprises structural units of the formula $$-R^1-O-\overset{\overset{\displaystyle O}{\|}}{C}-O-, \quad (I)$$

wherein $R^1$ is a divalent organic radical.

3. A method in accordance with claim 2, wherein $R^1$ is aromatic.

4. A method in accordance with claim 3, wherein $R^1$ has the formula $$(II) \quad -A^1-Y-A^2-,$$

wherein each of $A^1$ and $A^2$ is a monocyclic divalent aromatic radical and Y is a bridging radical in which one or two atoms separate $A^1$ from $A^2$.

5. A method in accordance with claim 1, wherein said polycarbonate comprises bisphenol A polycarbonate.

6. A method in accordance with claim 1, wherein the weight average molecular weight of the polycarbonate is 5000 to 100,000.

7. A method in accordance with claim 1, wherein said polycarbonate comprises at least one linear polycarbonate.

8. A method in accordance with claim 1, wherein said polycarbonate comprises at least one branched polycarbonate.

9. A method in accordance with claim 1, wherein said polycarbonate comprises at least one linear polycarbonate and at least one branched polycarbonate.

10. A method in accordance with claim 1, wherein said mixture further comprises a second polymer.

11. A method in accordance with claim 10, wherein said second polymer is selected from the group consisting of acrylonitrile/butadiene/styrene copolymer and polybutyl terephthalate.

12. A method in accordance with claim 1, wherein said polycarbonate redistribution catalyst is selected from the group consisting of amines; tetraalkyl ammonium hydroxides; tetraalkyl ammonium phenoxides; tetraalkyl ammonium acetates; tetraalkyl ammonium tetraphenylborates; lithium stearate; the lithium salt of bisphenol A; the tetraethyl ammonium salt of bisphenol A; sodium phenoxide; phosphines; organotin compounds; organotitanium compounds; zirconium tetra(isopropoxide); aluminum tri(ethoxide); aluminum tri(phenoxide); mercuric acetate; lead acetate; (diphenyl)mercury; (tetraphenyl)lead; (tetraphenyl)silane; hydrides; diphenylsilane; lithium hydroxide; sodium silicate; sodium borate; silica; lithium fluoride; lithium chloride; lithium carbonate; and zinc oxide.

13. A method in accordance with claim 1, wherein said polycarbonate redistribution catalyst is a tetraalkyl ammonium base.

14. A method in accordance with claim 1, wherein said polycarbonate redistribution catalyst is a tetraalkyl ammonium hydroxide.

15. A method in accordance with claim 14, wherein the quantity of tetraalkyl ammonium hydroxide is about 15 ppm to about 1000 ppm based upon the quantity of polycarbonate.

16. A method in accordance with claim 1, wherein said mixture further comprises a diaryl carbonate.

17. A method in accordance with claim 1, wherein said extruder comprises two vacuum ports.

18. A method in accordance with claim 1, wherein said extruder comprises a single screw.

19. A method in accordance with claim 1, wherein said extruder comprises a double screw.

* * * * *